S. L. ABBOTT.

Improvement in Countersink.

No. 4,754. Reissued Feb. 13, 1872.

*Witnesses:*

D. W. Scribner

E. C. Jordan

*Inventor:*

Suwall L. Abbott

Per William Henry Clifford
atty.

AM. PHOTO-LITHOGRAPHIC CO. N.Y. (OSBORNE'S PROCESS.)

UNITED STATES PATENT OFFICE.

SEWALL L. ABBOTT, OF DEERING, MAINE.

IMPROVEMENT IN COUNTERSINKS.

Specification forming part of Letters Patent No. 117,237, dated July 25, 1871; reissue No. 4,754, dated February 13, 1872.

*To whom it may concern:*

Be it known that I, SEWALL L. ABBOTT, of Deering, in the county of Cumberland and State of Maine, have invented a new and useful Countersink; and I hereby declare the following to be a full, clear, and exact description thereof, reference being had to the accompanying drawing, which is hereby made a part of this specification, in which—

Figure 1:
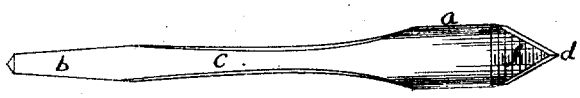
Figure 2:
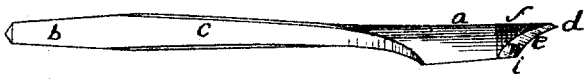
Figure 3:
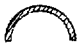

Figure 1 shows a view of the back side of the countersink. Fig. 2 shows a side or edge view. Fig. 3 shows a section of the lower part of the tool, designated at *a* to illustrate the form of curve.

The same letters show like parts.

The general purpose of my invention is to produce an improved form of tool for cutting depressions for the reception of screw-heads, bolt-heads, &c.

The part *b* of the shank shows that end of the cutting-tool which is designed to enter or be fastened in the socket of a bit-stock, or other tool to give rotation to the countersink, so as to enable it to cut the wood as desired. This end *b* is made square. *c* shows the stock, which may be made round or rectangular. The portion of the tool upon which the cutting-edges are made, and from which the point is made, is best seen in Fig. 3. It is of curved form, and concave upon that side or face where the cutting-edges are formed, and would form an oval if the curve were completed. This semi-circular or semi-oval part is, near the lower end, formed into a point at *d*, and the whole lower end has an appearance not unlike a pen-point. This is produced by filing or cutting down the edges in a taper form, as illustrated. The inner edge *e* is the cutting-edge, or the one that rims out the hole made for the reception of the screw-head. The line of the cutting-edge is not straight, however, from *i* to *d*, but is curved so that the whole edge *n* is slightly spiral in its formation or direction. The increasing width or V-shape back up from the point *d* enables the tool to cut recesses of various sizes, as may be desired, and to further this object gauge-marks *f* are cut in the back or convex part of that portion of the bit seen in section in Fig. 3. The curved cutting-edges *e* curving inwardly enable the tool to perform its work without breaking out the fibers of the wood in the recess. The inward curve of the edge *e* makes a slightly drawing cut, by which the fibers of the wood are, as it were, sawed off instead of merely severed or broken by the force of the rotation of the tool. The user has only to determine the diameter of the desired recess which he wishes to cut, and to ascertain which gauge-mark exhibits such diameter, and then to apply the tool till the gauge of the requisite diameter is on a line with the surface of the wood.

What I claim as my invention, and desire to secure by Letters Patent, is—

The countersink, constructed as herein described; that is, having the oval formed of the cutting portion, shown in section at Fig. 3, tapering point, the inner curved cutting-edge *e*, and point *d*, as herein set forth.

SEWALL L. ABBOTT.

Witnesses:

WILLIAM HENRY CLIFFORD,

D. W. SCRIBNER.